United States Patent
Schoor et al.

(10) Patent No.: US 11,598,843 B2
(45) Date of Patent: Mar. 7, 2023

(54) APPARATUS AND METHOD FOR ANALYZING RADAR SIGNALS

(71) Applicant: Robert Bosch GmbH, Stuttgart (DE)

(72) Inventors: Michael Schoor, Stuttgart (DE); Benedikt Loesch, Stuttgart (DE); Hermann Buddendick, Sindelfingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 275 days.

(21) Appl. No.: 17/047,874

(22) PCT Filed: Apr. 12, 2019

(86) PCT No.: PCT/EP2019/059579
§ 371 (c)(1),
(2) Date: Oct. 15, 2020

(87) PCT Pub. No.: WO2019/242905
PCT Pub. Date: Dec. 26, 2019

(65) Prior Publication Data
US 2021/0156955 A1 May 27, 2021

(30) Foreign Application Priority Data
Jun. 21, 2018 (DE) .......................... 102018210114.0

(51) Int. Cl.
*G01S 7/03* (2006.01)
*G01S 13/00* (2006.01)
(Continued)

(52) U.S. Cl.
CPC .............. *G01S 7/03* (2013.01); *G01S 13/003* (2013.01); *G01S 13/878* (2013.01); *G01S 13/931* (2013.01); *H01Q 25/00* (2013.01)

(58) Field of Classification Search
CPC ........ G01S 7/03; G01S 13/003; G01S 13/878; G01S 13/931; G01S 7/40; G01S 13/42; G01S 13/00; H01Q 25/00
See application file for complete search history.

(56) References Cited

U.S. PATENT DOCUMENTS

| 4,845,507 A | 7/1989 | Archer et al. |
| 6,275,180 B1 * | 8/2001 | Dean ..................... G01S 13/931 342/195 |

(Continued)

FOREIGN PATENT DOCUMENTS

| DE | 10036132 A1 | 2/2002 |
| DE | 102009029291 A1 | 3/2011 |

(Continued)

OTHER PUBLICATIONS

"Fast Fourier transform—Wikipedia.pdf" from https://web.archive.org/web/20171221150105/https://en.wikipedia.org/wiki/Fast_Fourier_transform (Year: 2017).*

(Continued)

*Primary Examiner* — Vladimir Magloire
*Assistant Examiner* — Yonghong Li
(74) *Attorney, Agent, or Firm* — Norton Rose Fulbright US LLP; Gerard Messina

(57) ABSTRACT

An analysis of radar signals, in particular of radar signals, which are received by a plurality of ULA antennas. By applying different beam formations to the radar signals of the individual ULA antennas, beamforming is used to compensate for dips in the gain.

8 Claims, 2 Drawing Sheets

(51) Int. Cl.
*G01S 13/87* (2006.01)
*G01S 13/931* (2020.01)
*H01Q 25/00* (2006.01)

(56) References Cited

U.S. PATENT DOCUMENTS

| | | | | |
|---|---|---|---|---|
| 2015/0325913 | A1* | 11/2015 | Vagman | H01Q 3/34 342/368 |
| 2016/0033632 | A1 | 2/2016 | Searcy et al. | |
| 2019/0129026 | A1* | 5/2019 | Sumi | G01S 15/8915 |

FOREIGN PATENT DOCUMENTS

| | | |
|---|---|---|
| DE | 102011084610 A1 | 4/2013 |
| DE | 102016210043 A1 | 12/2016 |
| DE | 102015221163 A1 | 5/2017 |
| DE | 102015222884 A1 | 5/2017 |
| DE | 102016224505 A1 | 6/2017 |
| EP | 3021132 A1 | 5/2016 |
| JP | H11234023 A | 8/1999 |
| JP | 2002185378 A | 6/2002 |
| JP | 2003318630 A | 11/2003 |
| JP | 2009168452 A | 7/2009 |
| JP | 2011180004 A | 9/2011 |
| JP | 2017058359 A | 3/2017 |
| JP | 2017166930 A | 9/2017 |
| JP | 2021527823 A | 10/2021 |
| WO | 9729388 A1 | 8/1997 |
| WO | 2016055455 A1 | 4/2016 |
| WO | 2017183097 A1 | 10/2017 |

OTHER PUBLICATIONS

International Search Report for PCT/EP2019/059579, dated Oct. 8, 2019.

* cited by examiner

APPARATUS AND METHOD FOR ANALYZING RADAR SIGNALS

FIELD

The present invention relates to an apparatus for analyzing radar signals, and to a method therefor.

BACKGROUND INFORMATION

In the automotive sector, radar sensors are increasingly being used for a greater number of tasks. For example, they supply data from the driving environment of a vehicle that a driving assistance system can analyze and further process. Moreover, radar sensors are vitally important, in particular in the field of automated driving as well. Especially decisive in this connection is the angular resolution, combined with high sensitivity, i.e., for a large positioning field.

To reduce computational outlay, antenna arrays having regularly arrayed antennas, what are generally referred to as Uniform Linear Arrays (ULA), can be used for such radar systems. An efficient beam formation can be realized here by a Fast Fourier Transform, FFT.

German Patent Application No. DE 10 2011 084 610 A1 describes an angularly resolving radar sensor for motor vehicles having an antenna that includes a plurality of antenna elements. Each antenna element is thereby switchable to one of a plurality of analysis channels and is coupled to an evaluation device to determine the angle of incidence of a received signal.

SUMMARY

The present invention provides an apparatus for analyzing radar signals and a method for analyzing radar signals.

In accordance with an example embodiment of the present invention, an apparatus is provided for analyzing radar signals. The apparatus includes a first antenna array, a second antenna array, a first processing device, a second processing device, and an evaluation device. The first antenna array includes a plurality of antenna elements. These are, in particular a plurality of preferably substantially identical antenna elements which are arrayed along a virtual axis. The first antenna array is designed to receive a first radar signal. The second antenna array includes a plurality of antenna elements. Analogously to the first antenna array, the antenna elements of the second antenna array are also arrayed along a virtual axis. In particular, the virtual axis, upon which are arrayed the antenna elements of the first antenna array, extends parallel to the virtual axis upon which the antenna elements of the second antenna array are arrayed. The second antenna array is designed to receive a second radar signal. The first processing device is designed to apply a first beam formation to the first radar signal received by the first antenna array. Analogously, the second processing device is designed to apply a second beam formation to the second radar signal received by the second antenna array. In particular, the second beam formation differs from the first beam formation. The evaluation device is designed to analyze the received radar signals using the results of the first beam formation and the second beam formation.

In accordance with an example embodiment of the present invention, a method for analyzing radar signals that includes the steps of receiving a first radar signal from a first antenna array and receiving a second radar signal from a second antenna array.

In addition, the method includes the steps of applying a first beam formation to the received first radar signal and a second beam formation to the received second radar signal. In particular, the second beam formation differs from the first beam formation. Finally, the method includes a step for analyzing the received radar signals using the results of the first and second beam formations.

The present invention is based on the realization that, in the case of an antenna array applying a digital beam formation to the radar signals, a varying gain occurs over the angular range of the positioning field. In particular, significant dips in the gain are observed over the angular range of the positioning field.

In accordance with an example embodiment of the present invention, therefore, this realization is taken into account and an analysis of the radar signals is provided that counteracts these dips in the gain and makes possible an analysis using an at least approximately more homogeneous profile over the angular range of the positioning field.

To this end, in accordance with an example embodiment of the present invention, a plurality of different beam formations is applied to the received radar signals; here, in particular a plurality of linear antenna arrays, preferably a plurality of antenna arrays having equidistantly spaced antenna elements (Uniform Linear Arrays, ULA) being used. In this case, an antenna array may apply a different beam formation to each radar signal. Preferably, the different beam formations may thereby complement one another to produce an at least approximately homogeneous antenna gain. For example, a beam formation for the radar signals of a first antenna array may have the maxima thereof in those ranges in which a beam formation for the radar signals from a second antenna array has the minima thereof. In this manner, the gain dips of the beam formation for the first antenna array may at least be nearly compensated by the corresponding beam formation for the radar signals from the second antenna array.

In the context of the present invention, a radar signal is understood to be the sum of all signals of the individual receive channels of the individual antenna elements of a linear antenna array. For example, a radar system may regularly, preferably periodically transmit high-frequency signals which are reflected off of an object to be detected. The reflected signals may then be received by the antenna elements of the antenna arrays and be provided for further processing in the individual receive channels. In this manner, by repeatedly transmitting high-frequency signals and receiving the corresponding radar responses, a plurality of radar signals are also received one after another in a time sequence and may then be analyzed.

A plurality of beams may thereby be shaped during beam formation. In particular, a separate beam formation may be carried out for each antenna. Thus, N beams, respectively radar signals also exist for N antennas.

In each particular case, the first and second antenna arrays may be separate antenna arrays having a plurality of antenna elements. Moreover, it is also possible that the two antenna arrays are formed by a common, two-dimensional antenna array. The individual antenna elements of the first antenna array and/or of the second antenna array, respectively of a common, two-dimensional antenna array may preferably be constituted of suitable receiving structures on a supporting substrate, in particular on a common supporting substrate.

In accordance with a specific embodiment of the present invention, the first antenna array and the second antenna array each include a same number of antenna elements. In particular, it is possible to adapt the number of antenna elements for the first and second antenna array for a most efficient possible further processing, for example, by a Fast Fourier Transform (FFT). Moreover, an equal number of antenna elements for the first and second antenna arrays makes it possible for the respective computation rules for the beam formation to also be readily coordinated.

In accordance with a specific embodiment of the present invention, the distances between each of any two adjacent antenna elements of the first and second antenna array are equal. The receiving properties of the two antenna arrays hereby match very well. Moreover, a balanced antenna gain may be achieved by appropriately adapting the first and second beam formations over a very broad angular range.

An alternative specific embodiment of the present invention provides that the distances between adjacent antenna elements of the first and second antenna arrays differ. This results in different receiving properties for the first and second antenna arrays. This make possible an enhanced antenna gain in a predefined preferred range.

A specific embodiment of the present invention provides that the processing device and/or the second processing device be designed to apply a plurality of beam formations to the radar signal received by the particular antenna array. By applying a plurality of different beam formations to one and the same radar signal, a homogenization of the antenna gain may thereby be achieved on an individual antenna array, for example, by appropriately superimposing the individual beam formations.

Moreover, it is also possible to apply a different beam formation to the individual, received radar signals, for example, for a sequence of radar signals that are received in time succession. This enables different beam formations to be applied to the received radar signals without the need here for increasing the computational outlay by a multiple beam formation.

A specific embodiment of the present invention provides that the maximum of the second beam formation be shifted by half of a bin relative to the maximum of the first beam formation. Shifting the two beam formations by half of a bin causes the maxima of the second beam formation to reside within the range of the minima of the first beam formation. A homogeneous profile of the gain may thereby be at least approximately realized over the angular range of the positioning field of a radar signal. In the case of the beam formation, a bin corresponds here to the distance between two adjacent maxima of the antenna beam.

One variant of the present invention provides that the apparatus include at least one further antenna array and a processing device corresponding to the further antenna array. The further processing device is designed to apply a further beam formation to the radar signals received by the further antenna array. By increasing the number of antenna arrays and corresponding processing devices, a further homogenization of the antenna gain may be achieved by adapting the beam formations accordingly.

A specific embodiment of the present invention provides that the first beam formation and the second beam formation be applied using a Fourier Transform, in particular a Fast Fourier Transform (FFT). This makes it possible to achieve an especially resource-saving and rapid beam formation.

In accordance with a specific embodiment of the present invention, the first beam formation and the second beam formation may be applied using a complex window function. Specifically, the complex window function makes it possible, for example, to realize a shift of the maxima of the second beam formation by half of a bin relative to the maximum of the first beam formation.

Where appropriate, the above embodiments and refinements may be combined in any desired manner. Other embodiments, refinements and implementations of the present invention include also not explicitly named combinations of features of the present invention, which have been described above or are described below with reference to the exemplary embodiments. In particular, one skilled in the art would also add individual aspects as improvements or additions to the particular basic forms of the present invention.

BRIEF DESCRIPTION OF THE DRAWINGS

Other features and advantages of the present invention are explained in greater detail below with reference to the figures.

DETAILED DESCRIPTION OF EXAMPLE EMBODIMENTS

Figure 1:
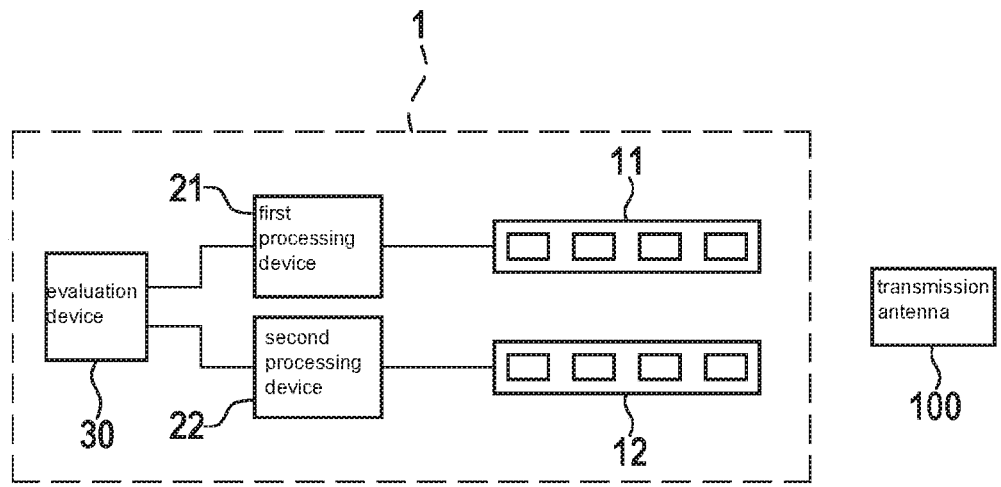
FIG. 1 is a schematic representation of a block diagram of an apparatus for analyzing radar signals in accordance with a specific embodiment of the present invention.

FIG. 1 is a schematic representation of a block diagram of a radar system, including an apparatus 1 for analyzing radar signals. The radar system includes a transmitting antenna 100 which transmits high-frequency signals. The transmitted signals may be reflected off of an object. The reflected signals are then received by the antenna elements of antenna arrays 11 and 12 and provided at the respectively connected processing devices 21 and 22. In this context, the radar signal is understood to be the totality of all receive channels of the antenna elements of an antenna array 11 or 12, which correspond in each case to a transmitted radar signal. In response to the repeated transmission of transmission signals by transmission antenna 100, time sequences of a plurality of radar signals are also received in each case by antenna elements of antenna arrays 11 and 12.

Antenna arrays 11 and 12 are preferably antenna arrays having a plurality of equidistantly arrayed antenna elements, the individual antenna elements of an antenna array 11 or 12 each being arrayed along a virtual axis. The virtual axis, upon which are arrayed the antenna elements of first antenna array 11, preferably extends parallel to the virtual axis upon which the antenna elements of second antenna array 12 are arrayed. The two antenna arrays 11 and 12 may be two completely mutually independent antenna arrays. In particular, first antenna array 11 and second antenna array 12 may each be realized on different supporting substrates. Moreover, it is also possible that first antenna array 11 and second antenna array 12 are realized as a common, two-dimensional antenna array. For example, the antenna elements of first antenna array 11 and of second antenna array 12 may be arrayed on a common supporting substrate. Moreover, it is also possible that transmitting antenna 100 having one or a plurality of antenna elements is likewise implemented on the supporting substrate for first antenna array 11 and second antenna array 12.

The configuration illustrated in FIG. 1 which includes four antenna elements for first antenna array 11 and second antenna array 12, respectively, is merely for purposes of understanding and should not be construed as limiting the present invention. Also possible, rather, is any other number of antenna elements for first antenna array 11 and for second antenna array 12. First antenna array 11 and second antenna array 12 thereby preferably have the same number of antenna elements. Moreover, it is also fundamentally possible, however, that the number of antenna elements for first antenna array 11 differs from the number of antenna elements for second antenna array 12.

Two adjacent antenna elements of first antenna array 11 and of second antenna array 12, respectively, are spaced apart at the same distance, i.e., the individual antenna elements of an antenna array 11, respectively 12 are equidistantly arrayed. In particular, the distance between two adjacent antenna elements of first antenna array 11 and the distance between two adjacent antenna elements of second antenna array 12 may be the same.

Moreover, it is likewise possible, however, that the distance between two adjacent antenna elements of first antenna array 11 is larger or smaller than the distance between two adjacent antenna elements of second antenna array 12.

For the further processing, the signals received by the individual antenna elements of first antenna array 11 are jointly fed as a first radar signal to first processing device 21. Analogously, the signals received by the antenna elements of second antenna array 12 are fed as a second radar signal to second processing device 22.

Using the signals provided by the antenna elements of first antenna array 11, first processing device 11 computes a first beam formation for a radar signal in each case. In particular, the beam formation may be performed very readily using a Fast Fourier Transform (FFT) in the case of an above-described configuration of the first antenna array including equidistantly arrayed antenna elements as already described above. Since the fundamentals of such a beam formation using FFT are conventional, there is no need for a corresponding explanation here. By using a suitable window function, for example, it is thereby possible to realize the digital beam formation of the radar signal on the basis of the individual signals of the antenna elements.

Analogously to first processing device 21, second processing device 22 likewise performs a beam formation for a second radar signal, which includes the signals provided by the antenna elements of second antenna array 12. This beam formation may also be applied using a suitable Fast Fourier Transform.

Second processing device 22 thereby performs a second beam formation which differs from the first beam formation performed by first processing device 21. In this instance, the maxima of the first beam formation preferably reside in angular ranges within which the second beam formation has minima. Analogously, the first beam formation has minima in those angular ranges within which the second beam formation has maxima.

Figure 2:
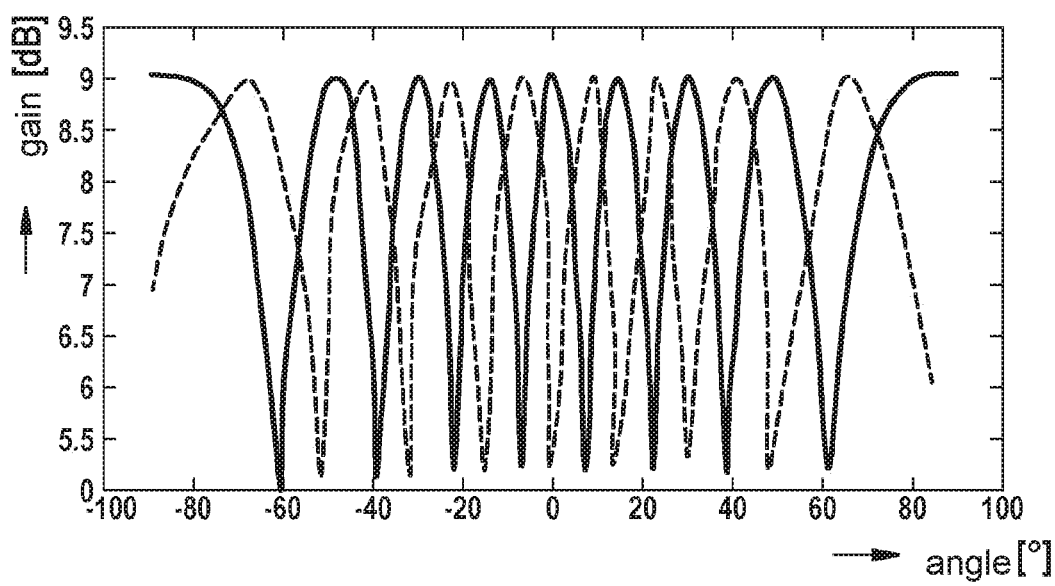
FIG. 2 is a schematic representation of the antenna gain following the beam formations in accordance with a specific embodiment of the present invention.

FIG. 2 is a schematic representation of the antenna gain for the first beam formation, which is shown as a solid line, and the antenna gain for the second beam formation, which is shown as a dashed line. A clear homogenization of the antenna gain to be achieved over the entire angular range of the radar system is derived by superimposing the two antenna gains.

Preferably, first processing device 21 thereby performs a fixed first beam formation, and second processing device 22 performs a fixed second beam formation. Moreover, it is also possible, however, that the first and second beam formation to be performed are variably adapted. In addition, it is also possible that first processing device 21 and/or second processing device 22 perform more than only one beam formation. For example, each of the two processing devices 21, 22 may perform two beam formations, yielding, altogether, four beam formations, the individual beam formations being mutually adapted in a way that enables a most homogeneous possible antenna gain to be achieved by a superimposition of all beam formations.

The maxima of the individual beam formations may thereby be shifted, for example, by using a complex window function. For example, an appropriate complex window function makes it possible to realize a shift of the maxima of the second beam formation by half of a bin relative to the maxima of the first beam formation. Such a window function may be realized, for example, by the following formula:

$$w(n) = \exp(j*2*pi*0.5*n/N) = \exp(j*pi*n/N)$$

Here:
w: is the complex window function
N: is the number of antenna elements 2-$i$ of an antenna array 11 or 12
n: is the receive channel of an antenna element 2-$i$ of corresponding antenna array 11 or 12.

Besides the above-described exemplary embodiment that includes two antenna arrays 11 and 12, it is also possible to use more than two, for example, three, four or more antenna arrays, in particular antenna arrays having equidistantly arrayed antenna elements. Here, using the receive channels of the antenna elements of an antenna array, a corresponding processing device, which performs a suitable beam formation, may be implemented for the radar signal. If there are more than two beam formations, the maxima of the individual beam formations may be shifted in each case as a function of the number of beam formations. Thus, for example, when three antenna arrays are used, the individual maxima may each be shifted by one third relative to each other, or, in general, in the case of n antenna arrays, the maxima may each be shifted by 1/n relative to each other.

The results of the individual beam formations are fed to an evaluation device 30 which is able to carry out a processing of the radar signals in each case using the individual beam formations. In this case, for example, a detection of one or of a plurality of objects, a determination of an object velocity, or the like may be carried out. Moreover, it is self-evident that any other suitable analyses of the radar signals are also possible using the plurality of beam formations.

Figure 3:
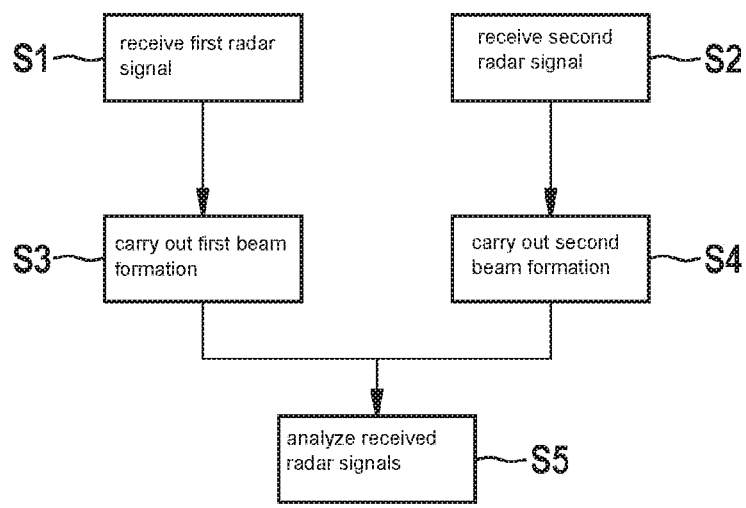
FIG. 3 is a schematic representation of a flow chart underlying a method for analyzing radar signals in accordance with a specific embodiment of the present invention.

FIG. 3 is a schematic representation of a flow chart underlying a method for analyzing radar signals in accordance with a specific embodiment. In step S1, a first radar signal is received by a first antenna array 11. In addition, in step S2, a second radar signal is received by a second antenna array 12. Preferably, the first radar signal and the second radar signal are received at the same point in time. In step S3, a first beam formation is carried out on the received first radar signal, and, in step S4, a second beam formation is carried out on the received second radar signal. The second beam formation thereby differs from the first beam formation. Finally, in step S5, the received radar signals are analyzed using the results of the first and second beam formations. The analysis may include, for example, a detection of one or of a plurality of objects, a determination of an object velocity, or the like. Moreover, it is self-evident that any other analyses of the radar signals are possible.

In summary, the present invention relates to an improved analysis of radar signals, in particular of radar signals, which are received by a plurality of ULA antennas. By applying different beam formations to the radar signals of the individual ULA antennas, beamforming may be used to compensate for dips in the gain.

What is claimed is:

1. An apparatus comprising:
a first antenna array having a first plurality of antenna elements, the first antenna array configured to receive a first sequence of radar signals over time via a combination of the first plurality of antenna elements;
a second antenna array having a second plurality of antenna elements, the second antenna array configured to receive a second sequence of radar signals over time via a combination of the second plurality of antenna elements;
a first processing device configured to perform a first beam formation on the first sequence of radar signals received by the first antenna array;
a second processing device configured to perform on the second sequence of radar signals received by the second antenna array a second beam formation that differs from the first beam formation; and
an evaluation device configured to determine an environment by analyzing a combination of the received first and second sequences of radar signals using results of the first and second beam formations;
wherein the first and second beam formations are performed such that, for those radar signals of the first and second sequences of radar signals that occur simultaneously in a moment of time, maxima of antenna gains over an angular range of the second beam formation are shifted by half of a bin relative to maxima of antenna gains over an angular range of the first beam formation.

2. The apparatus as recited in claim 1, wherein all of the antenna arrays of the have a same number of antenna elements as one another.

3. The apparatus as recited in claim 1, wherein a distance between adjacent antenna elements of the first antenna array is equal to a distance between adjacent antenna elements of the second antenna array.

4. The apparatus as recited in claim 1, further comprising:
at least one further antenna array, and a processing device corresponding to the further antenna array that is configured to apply a further beam formation to radar signals received by the further antenna array.

5. A method for analyzing radar signals, the method comprising the following steps:

receiving a first sequence of radar signals via a combination of a first plurality of antenna elements of a first antenna array;
receiving a second sequence of radar signals via a combination of a second plurality of antenna elements of a second antenna array;
performing a first beam formation on the first sequence of radar signals received by the first antenna array;
performing on the second sequence of radar signals received by the second antenna array a second beam formation that differs from the first beam formation; and
determining an environment by analyzing a combination of the received first and second sequences of radar signals using results of the first and second beam formations;
wherein the first and second beam formations are performed such that, for those radar signals of the first and second sequences of radar signals that occur simultaneously in a moment of time, maxima of antenna gains over an angular range of the second beam formation are shifted by half of a bin relative to maxima of antenna gains over an angular range of the first beam formation.

6. The method as recited in claim 5, wherein the application of the first beam formation and the application of the second beam formation each includes a Fourier Transform.

7. The method as recited in claim 6, wherein the application of the first beam formation and/or the application of the second beam formation includes using a complex window function.

8. An apparatus comprising:
a number (N) of antenna arrays that each have a respective plurality of antenna elements and that each is configured to receive a respective radar signal, the number being at least three;
a processing arrangement, wherein the processing arrangement is configured to apply a respective beam formation to each of the respective radar signals received by the respective antenna arrays, such that, for those of the radar signals occurring simultaneously at a moment in time, antenna gains of respective maxima of antenna gains over respective angular ranges of the respective beam formations are shifted by 1/N of a bin relative to one another; and
an evaluation device configured to analyze the received respective radar signals using results of the respective beam formations.

* * * * *